US 9,098,271 B2

(12) United States Patent
Eastlack

(10) Patent No.: US 9,098,271 B2
(45) Date of Patent: Aug. 4, 2015

(54) AUTONOMOUS MICROPROCESSOR RE-CONFIGURABILITY VIA POWER GATING PIPELINED EXECUTION UNITS USING STATIC PROFILING

(71) Applicant: Jeffrey R. Eastlack, Austin, TX (US)

(72) Inventor: Jeffrey R. Eastlack, Austin, TX (US)

( * ) Notice: Subject to any disclaimer, the term of this patent is extended or adjusted under 35 U.S.C. 154(b) by 327 days.

(21) Appl. No.: 13/759,587

(22) Filed: Feb. 5, 2013

(65) Prior Publication Data

US 2013/0205143 A1 Aug. 8, 2013

Related U.S. Application Data

(60) Provisional application No. 61/595,136, filed on Feb. 5, 2012.

(51) Int. Cl.
*G06F 1/00* (2006.01)
*G06F 1/32* (2006.01)

(52) U.S. Cl.
CPC .......................................... *G06F 1/32* (2013.01)

(58) Field of Classification Search
CPC ................................ G06F 1/3203; G06F 1/32
USPC ............................. 712/24, 228, 218; 709/250
See application file for complete search history.

(56) References Cited

U.S. PATENT DOCUMENTS

| | | | |
|---|---|---|---|
| 6,219,796 B1 * | 4/2001 | Bartley | 713/320 |
| 7,100,063 B2 * | 8/2006 | Sasagawa | 713/323 |
| 7,246,219 B2 * | 7/2007 | Samra et al. | 712/218 |
| 7,266,707 B2 | 9/2007 | Ngo et al. | |
| 7,428,645 B2 * | 9/2008 | O'Connor et al. | 713/300 |
| 7,447,923 B2 | 11/2008 | Bose et al. | |
| 7,490,302 B1 | 2/2009 | Rahman et al. | |
| 7,539,884 B2 | 5/2009 | You et al. | |
| 7,620,832 B2 * | 11/2009 | Kissell | 713/324 |
| 7,805,620 B2 * | 9/2010 | Yang et al. | 713/300 |
| 7,844,742 B2 * | 11/2010 | Pope et al. | 709/250 |
| 7,868,479 B2 | 1/2011 | Subramaniam | |
| 7,996,671 B2 * | 8/2011 | Chheda et al. | 713/164 |
| 8,245,065 B2 | 8/2012 | Niggemeier et al. | |
| 8,327,122 B2 * | 12/2012 | Lee et al. | 712/228 |
| 8,607,209 B2 * | 12/2013 | Chheda et al. | 717/158 |
| 8,769,245 B2 * | 7/2014 | Hsieh et al. | 712/24 |
| 2012/0017198 A1 | 1/2012 | Ng | |

* cited by examiner

*Primary Examiner* — Thomas Lee
*Assistant Examiner* — Aurel Prifti
(74) *Attorney, Agent, or Firm* — Andrew Alia

(57) ABSTRACT

In an embodiment, a method of controlling a functional unit of a target processor includes, using a static code profiler operating on a developer processor and while generating a machine executable instruction from software code, determining whether a functional unit type will be used to perform a process of the machine executable instruction. The method also includes updating a specific needs profile of the process of the machine executable instruction in accordance with the output of the static code profiler, wherein operation of the functional unit having the functional unit type is based on the configuration of the specific needs profile. The method further includes storing the specific needs profile in a configuration register. One or more processes and/or specific needs values or profiles may be loaded at each context switch of the operating system.

17 Claims, 13 Drawing Sheets

| OS Time Quantum | Time Quantum 1 | Time Quantum 2 | Time Quantum 3 | Time Quantum 4 | Time Quantum 5 | Time Quantum 6 |
|---|---|---|---|---|---|---|
| Running Process | P1 702 | P2 704 | P3 706 | P1 702 | P2 704 | P3 706 |
| FP/Int Divider 314 | OFF | OFF | OFF | OFF | OFF | OFF |
| FP/Int Divider 316 | OFF | ON | OFF | OFF | ON | OFF |
| FP/Int Multiply 310 | ON | OFF | OFF | ON | OFF | OFF |
| FP/Int Multiply 312 | ON | OFF | OFF | ON | OFF | OFF |
| FP Adder 306 | ON | ON | OFF | ON | ON | OFF |
| FP Adder 308 | ON | OFF | ON | ON | OFF | OFF |
| Integer ALU 302 | ON | ON | ON | ON | ON | ON |
| Integer ALU 304 | 720 | 722 | 724 | 720 | 722 | 724 |

FIG. 8

AUTONOMOUS MICROPROCESSOR RE-CONFIGURABILITY VIA POWER GATING PIPELINED EXECUTION UNITS USING STATIC PROFILING

CROSS REFERENCE TO RELATED APPLICATION

This application claims the benefit of U.S. Provisional Application No. 61/595,136, filed on Feb. 5, 2012, which is hereby incorporated by reference in its entirety.

BACKGROUND

Static power dissipation is quickly becoming the main component to the overall power consumption of the modern microprocessor or integrated circuit (IC). As we reduce horizontal feature size of the transistors we also reduce the vertical feature size. Transistors are built by the vertical layering of electrically dissimilar materials with extremely low and precise geometrical tolerances at the atomic scale. Some of the vertical slices are significantly thinner than the horizontal features. The gate oxide layer which separates charge between the gate from the p and n channels of the substrate can be measured by counting atoms of thickness. As this vertical scaling continues beyond 32 nm, the electric polarization field will continue to weaken and thus the gate oxide loses the ability to separate charge. Because of this, electrons have a less restricted flow. This results in increased static power or "leakage power," which is now becoming the dominant power loss as process technology continues to scale. Functional units (FUs) within a pipeline's execution stages account for a large percentage of the microprocessors "on chip" real-estate. The amount of leakage within a given process technology is largely proportional to the number of transistors on the die. As static leakage power dissipation continues to worsen as CMOS scaling continues, technologies that reduce or eliminate leakage power dissipation will be of paramount importance.

A general purpose computing system is typically controlled by a time multiplex operating system (OS) where programs or processes are executed by the microprocessor in a quasi-parallel manner. The OS may schedule a program for a specific duration known as a "time quantum" which may last for a duration of several million clock cycles. A computing system may have several programs or processes running from memory, where they granted a "time quantum" or turn to be ran on the microprocessor. The OS manages the execution of these programs and each program may be granted a time quantum which will be eventually interrupted by the OS by what is called a "context switch" where the operating system saves the processors register state of the current program before allowing the next program to be executed during the next time quantum.

The needs of each program running on a general purpose microprocessor are very different, as such high end microprocessors are usually designed to accommodate a broad range of different programs and applications. In many cases this results in an over design which comes in the form of an aggressive superscalar architecture that may have a large number of FUs that may be in the idle state for a significant amount of the time where they are incurring static leakage power without the benefit of real work being done.

PRIOR ART

"Power gating for multimedia processing power management," U.S. Pat. No. 7,868,479, pertains to a power management implementation designed to save power while driving a multimedia display.

"Power gating various number of resources based on utilization levels," U.S. Pat. No. 7,868,479, involves the use of programmable logic devices (PLD) such as a FPGA. The technology statically power gates unused general purpose logic blocks within a programmable logic device during the programming phase.

"Systems and methods for mutually exclusive activation of microprocessor resources to control maximum power," U.S. Pat. No. 7,447,923 involves monitoring the maximum power threshold to invoke or power gate resources if the maximum power is below or above the specified threshold respectively.

"Dynamic leakage control circuit," U.S. Pat. No. 7,266,707 involves power gating stages within a pipeline.

"Predictive Power Gating with Optional Guard Mechanism," U.S. Pat. No. 8,219,834, involves using an algorithm to predict units to power gate. "Power gating instruction scheduling for power leakage reduction," U.S. Pat. No. 7,539,884, involved inserting power status instructions into the instruction stream.

"Application driven power gating" U.S. patent application Ser. No. 12/835,628, involved the use of on chip hardware profiling that scans the types of instructions in the instruction stream by the instruction decoder to generate a profile.

"Power gating processor execution units when number of instructions issued falls below a threshold and are independent until instruction queue is full" U.S. Pat. No. 8,245,065, involves the use of a hardware based profiler unit that monitors IPC to determine the power state of the functional units.

SUMMARY

Field of Invention

This invention relates to power gating technology within a microprocessor's pipeline stages. When a functional unit within a stage of a microprocessor's pipeline, such as, but not limited to, a floating point multiplier or divider is not needed by a specific program, it will be power gated. In the proposed invention, no prediction is necessary as the instruction stream is profiled statically before being ran on the processor.

In some embodiments, the instruction stream is not modified and a process tailored hardware configuration is stored in a look up table.

In some embodiments, profiling is performed using software rather than specialized hardware that performs constant profiling.

A modern high-end microprocessor may have more than a dozen functional units within the execution stages of its pipeline. This plurality of functional units is included to provide an increase in instruction level parallelism during the execution of a program in order to increase the instruction execution throughput. In many cases, depending on the instruction stream of the program, many of these functional units remain in the idle state, in which they incur static leakage power dissipation. As a result, power dissipation in an integrated circuit or microprocessor reduces battery life and increases the temperature of the IC, which limits reliability and life of the IC.

The power gating pipeline control method proposed in this invention disclosure uses a static code profiler 508 to scan the type of assembly instruction that is generated by a compiler 506 as a means to map that instruction stream to specific FUs seen in 318 of FIG. 4 which are needed for the execution of the program. The FUs from 318 that are not needed will be power gated. The static profiling algorithm like the one shown in FIG. 5 will generate a configuration profile such as 720, 722, and 724 which will be forwarded to a configuration register 406 that may be mapped to example programs such as 702, 704, and 706. Each time a context switch is invoked, the configuration profile will be forwarded to the configuration register 406 by the OS or supporting hardware as part of the context switch for each specific program or application. Using this configuration, the microprocessor may invoke a multitude of personalities in the form of dynamically power gated FUs in the execution stages of a pipeline that is specifically tailored to the running program or application. The granularity of the configurability may be adjustable, however, in some embodiments, the FUs within the execution stages of the pipeline may be enabled or power gated in a different state for each context switch by the OS or supporting hardware.

This method will eliminate dynamic and static power dissipation associated with that particular functional unit during the OS time quantums where a particular number of FUs is not needed as shown in FIG. 8. This example shows the power state of each functional unit shown in the execution stage of 318 which has been statically determined by the code profiler 508 and then forwarded to the configuration register 406 by the OS 904 at the start of each context switch.

An input parameter 726 such as a flag may be used to give the programmer control over the performance versus power balance. The example shown in FIG. 7 shows a '1' set to favor performance and a '0' set to favor power. If the input parameter is set to favor power then the enablement of the plurality of identical instances of FUs such as 302 or 304, 306 or 308, 310 or 312, and 314 or 316 may be limited for program execution. In this case they will be power gated like program 704 as shown in FIG. 8

In addition to power gating the FUs that are not being used during a program's execution, this invention method allows designers to implement more aggressive superscalar implementations with a larger number of FUs, as this system architecture will dynamically control the power state of these same FUs. As a result, power penalties associated with over designing the architecture for an instruction case that does not need to be supported for a specific program will be eliminated.

With this, hardware and software will have tighter coupling as the hardware's FUs in this invention disclosure will dynamically adapt to the programs specific needs profile 514 such as 720, 722, and 724. In short, this invention can either provide relief to the power budget with a microprocessor implementation that uses less power, or it can allow designers to develop more aggressive microprocessor implementations without exceeding the power budget.

BRIEF DESCRIPTION OF THE DRAWINGS

FIG. 8 is a matrix diagram that shows the three example programs from FIG. 7 running in succession on a time multiplexed operating system, according to an embodiment. The diagram shows six time periods or "time quantum" that are separated by a context switch and the associated FUs that are enabled or power gated depending on the programs specific needs configuration profile.

DETAILED DESCRIPTION

Figure 6:
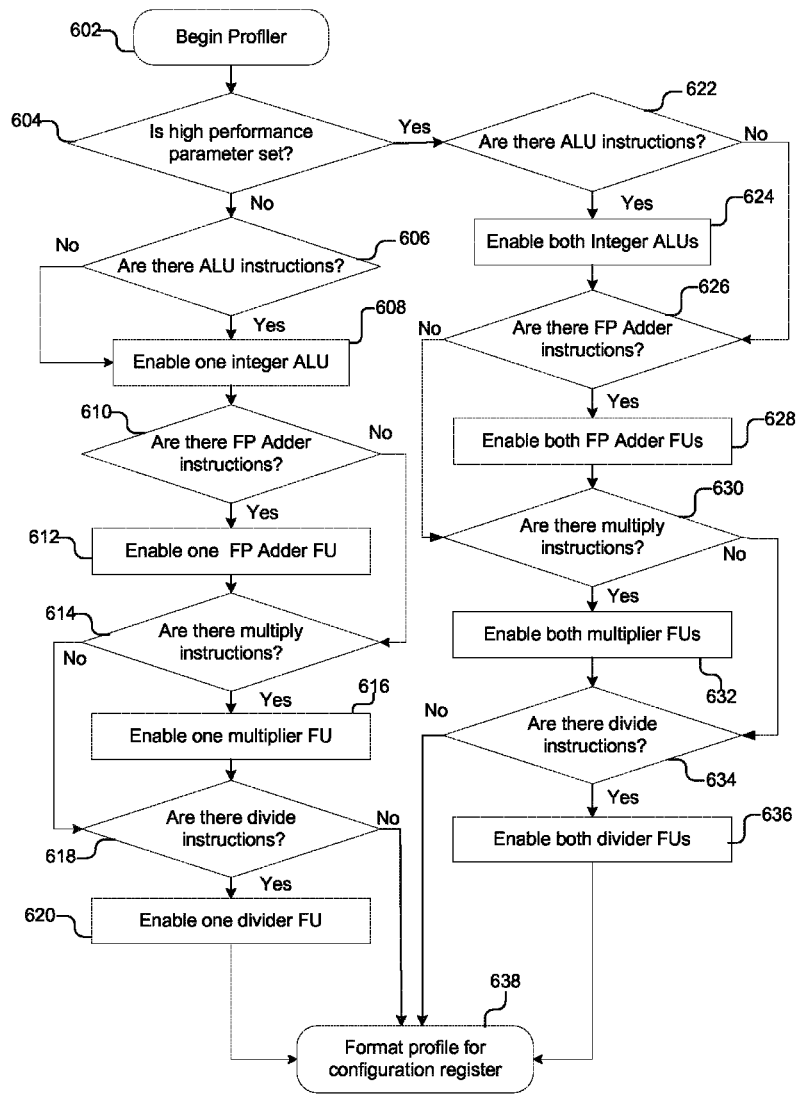
FIG. 6 shows a possible implementation of a profiling algorithm that may be used to determine which FUs will be power gated during a programs execution, according to an embodiment. The algorithm takes in an input parameter that will determine if one or both instances of particular FU are to be enabled or power gated.

The basic concept of this invention is to use a static profiler 508 which may use an algorithm similar to the one disclosed in FIG. 6 to create a need specific configuration profile like profiles 720, 722, and 724 for each running process or program such as 702, 704, and 706 respectively. During a context switch shown in FIG. 8 invoked by the by the OS 904, the specific needs profile 514 will be forwarded to the configuration register 406 where it is latched for the entire duration of the processes time quantum until the next context switch. The specific needs profile will determine which of the available FUs will be enabled or power gated during the time quantum where the process is running on the CPU. The FUs reside within the execution stages of the microprocessor pipeline as shown in 210 of FIG. 2, 318 of FIG. 3 and FIG. 4.

Figure 1:
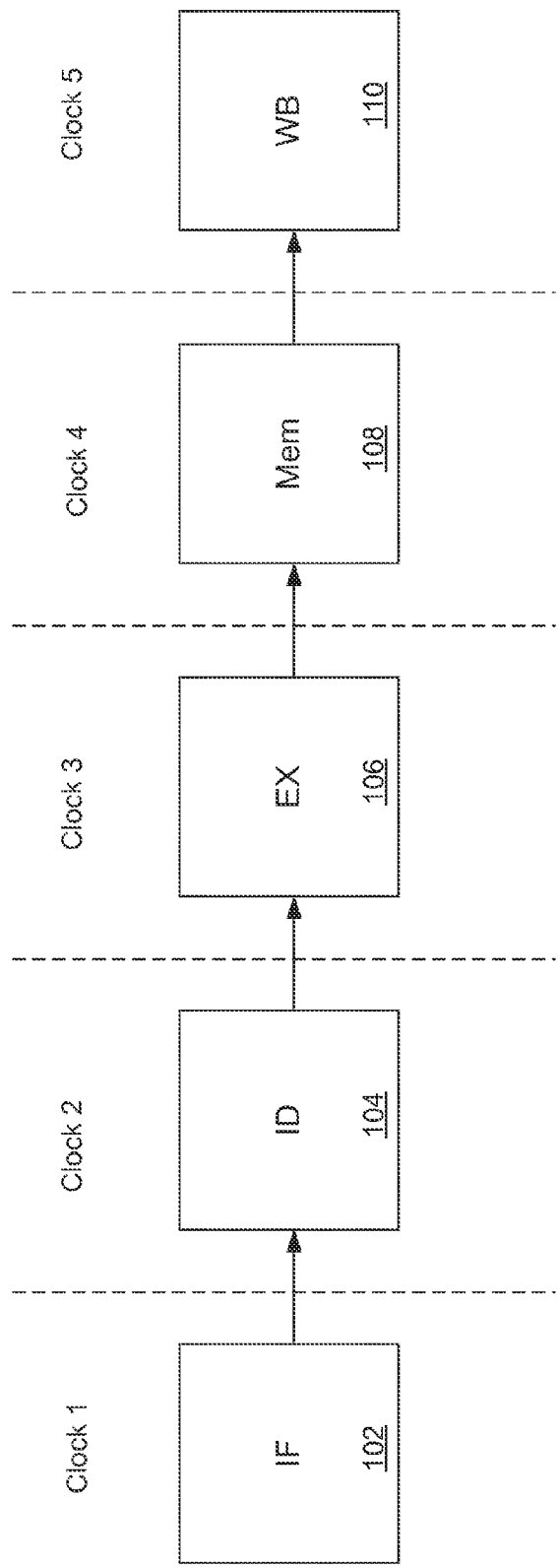
FIG. 1 shows a diagram of the classic five stage pipeline within a microprocessor, according to an embodiment.

The concept of pipelining was introduced commercially around the 1980's as a way to exploit instruction level parallelism with the execution of a sequential program. Operations to be performed on the instructions are broken down into stages that occur in succession. The instructions enter the pipeline in an assembly line fashion to effectively increase the throughput of completed instructions. FIG. 1 shows a classic five stage pipeline. The first stage of the pipeline is the instruction fetch (IF) stage 102, which among other things the current instruction is fetched from memory. Then second stage is the instruction decode (ID) stage 104 where decoding is done in parallel to register reads. The third stage is the execution stage (EX) 106, which is a main focus of this invention disclosure and where the FUs that perform mathematical and logic operations reside within the pipeline's operational timeline. The fourth stage is a memory access 108 stage which applies to loads and stores and finally the write back stage 110 to registers.

Figure 2:
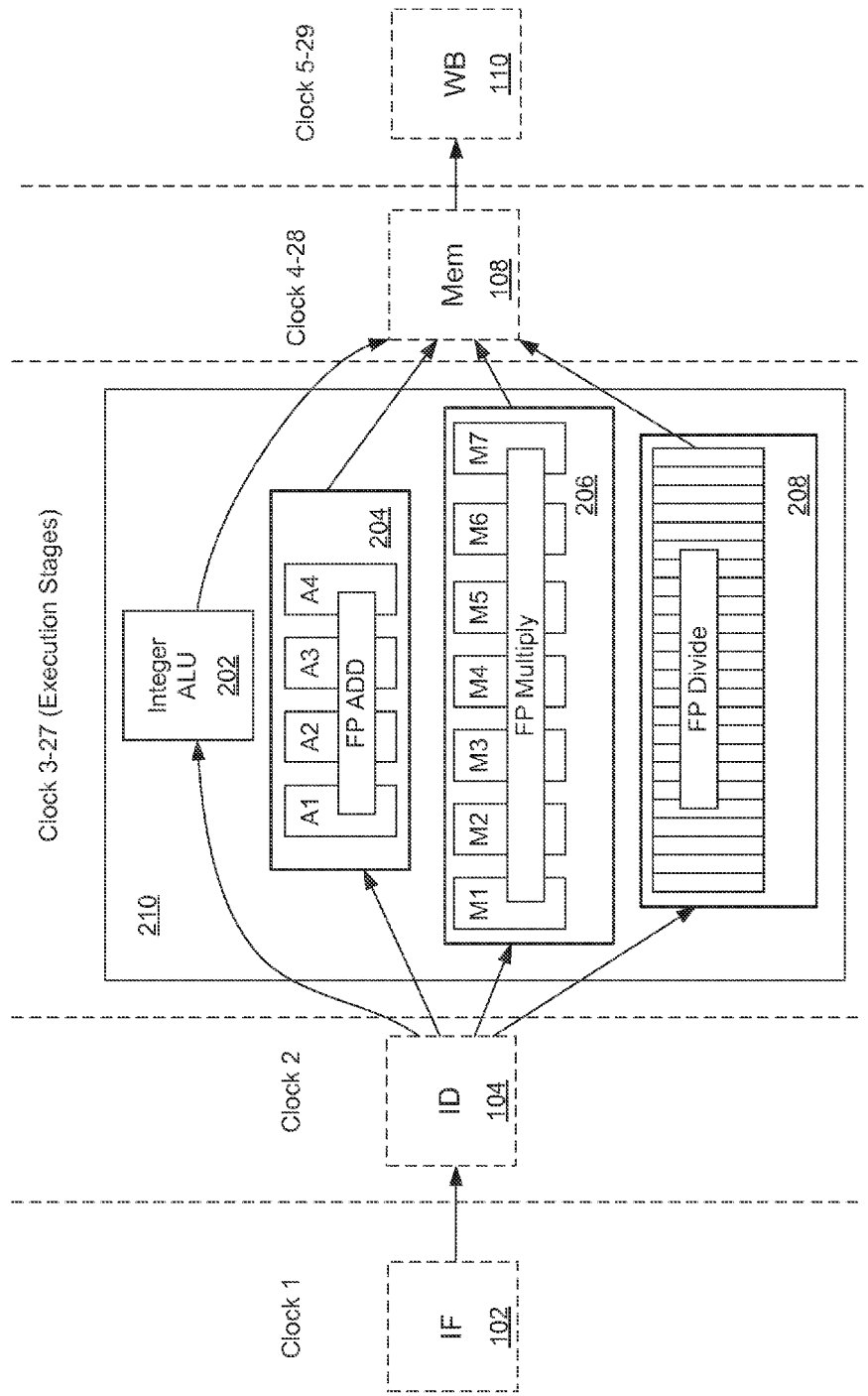
FIG. 2 shows an expansion of the classic five stage pipeline from FIG. 1 to support multi-cycle mathematical operations within the execution stages, according to an embodiment. In this case, multi-cycle operations are pipelined.
Figure 3:
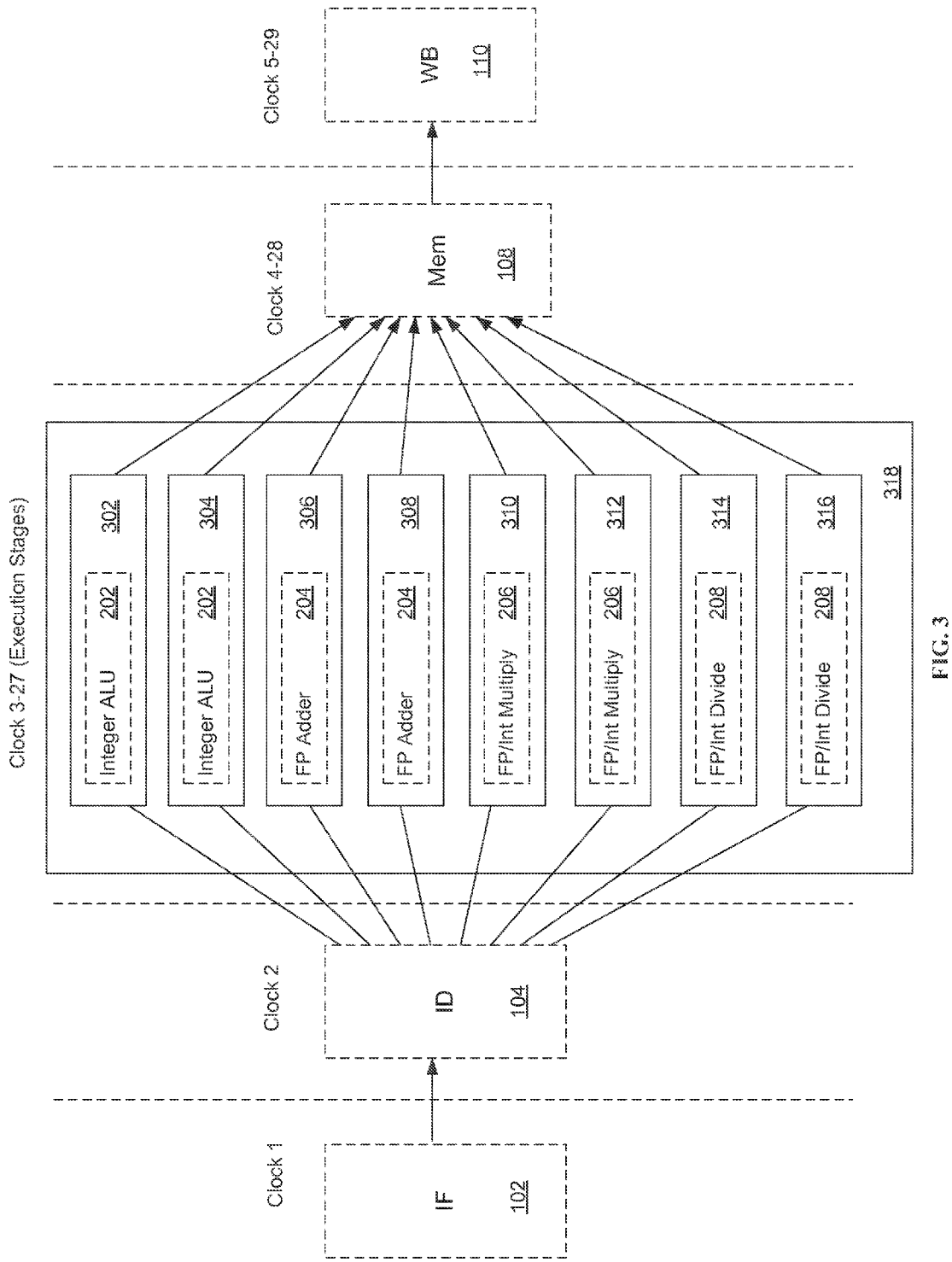
FIG. 3 shows a pipelined implementation where the execution stages have more than one instance of the same type of functional unit such as two integer arithmetic logic units (ALUs), two floating point adders, two floating point/integer multipliers, and two floating point/integer dividers, according to an embodiment.

FIG. 2 shows the expansion of the classic five stage pipeline to accommodate multi-cycle operations such as floating point math calculations. In this example, four FUs within the execution stages 210 are described. The first is 202, which is the integer arithmetic logic unit (ALU) from the five stage pipeline of FIG. 1; this unit may complete operations in 1 clock cycle. The second functional unit is the adder 204, which takes a total of 4 clock cycles to complete. The third is the multiplier unit 206, which can handle both floating point and integer data values and complete the operation in 7 clock cycles in this example. The last functional unit in FIG. 2 is the divider 208, which can handle both floating point and integer data values and takes a total of 25 clock cycles to complete. FIG. 3 shows how multiple instances of the same FU such as two integer ALUs 302 and 304, two floating point adders 306 and 308, two floating point/integer multipliers 310 and 312, and two floating point/integer dividers 314 and 316 can be implemented in the execution stages of a pipeline to increase throughput. This is common on high end superscalar microprocessors for the case that they may be needed by the program. In many cases, it is an over design that comes with a penalty of both static and dynamic power consumption.

Figure 4:
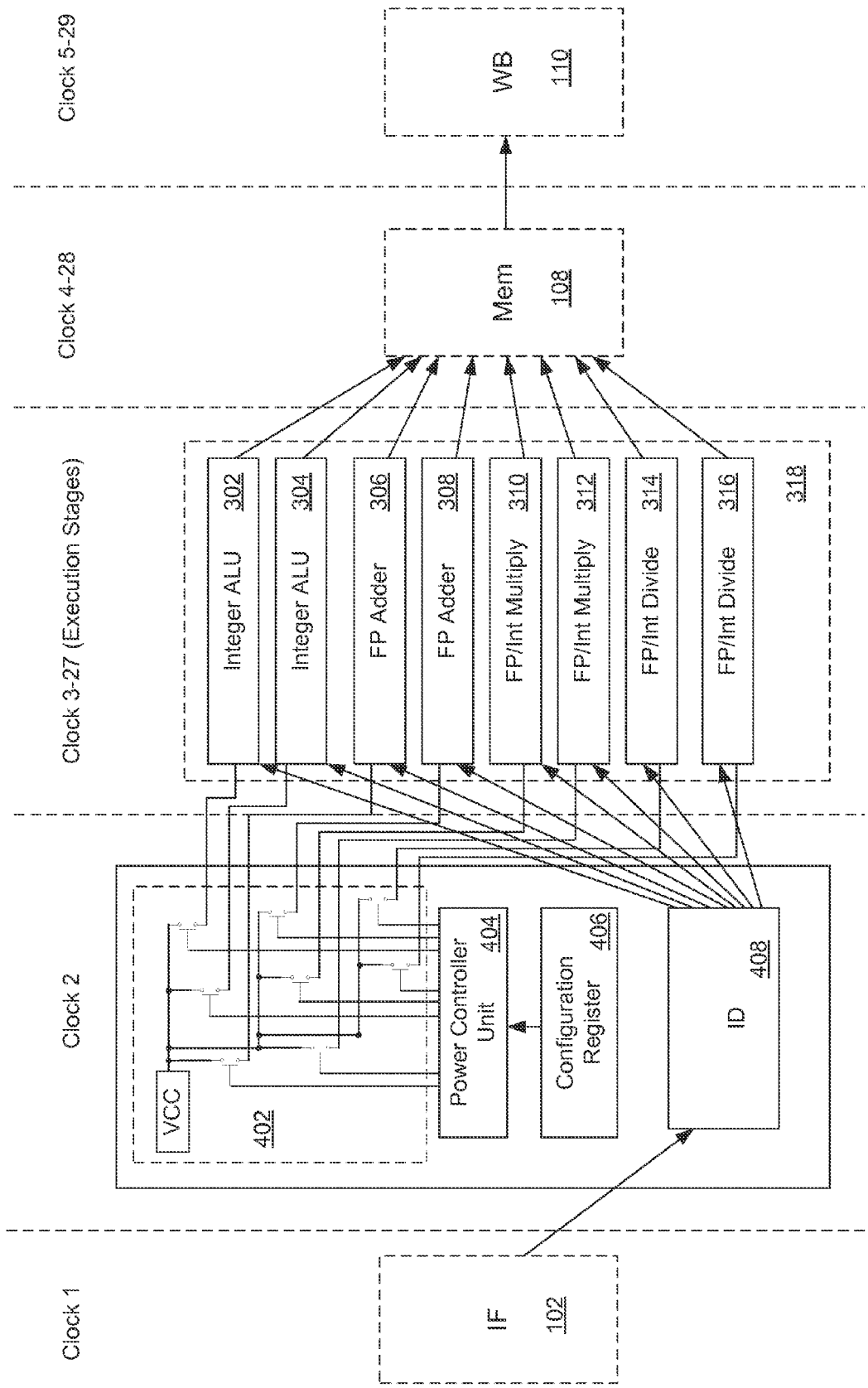
FIG. 4 introduces power gating circuitry to the pipeline's execution stages, according to an embodiment. The power controller unit selects FUs as defined by the configuration register.

The diagram of the pipeline shown in FIG. 4 has been augmented to include a power switch network 402, a power controller unit 404, and a configuration register 406 which stores the specific needs profile 514 like 720, 722, and 724 of the example processes 702, 704, and 706. The power controller unit 404 maps the process profile data to the switch network 402 to enable or power gate the specific FUs in the execution stages. Depending on the power input parameter 726 the static profiler 508 may only enable one of two like FUs, in which case the instruction decode unit 408 will disable the ability to issue instructions to power gated FUs.

Figure 5:
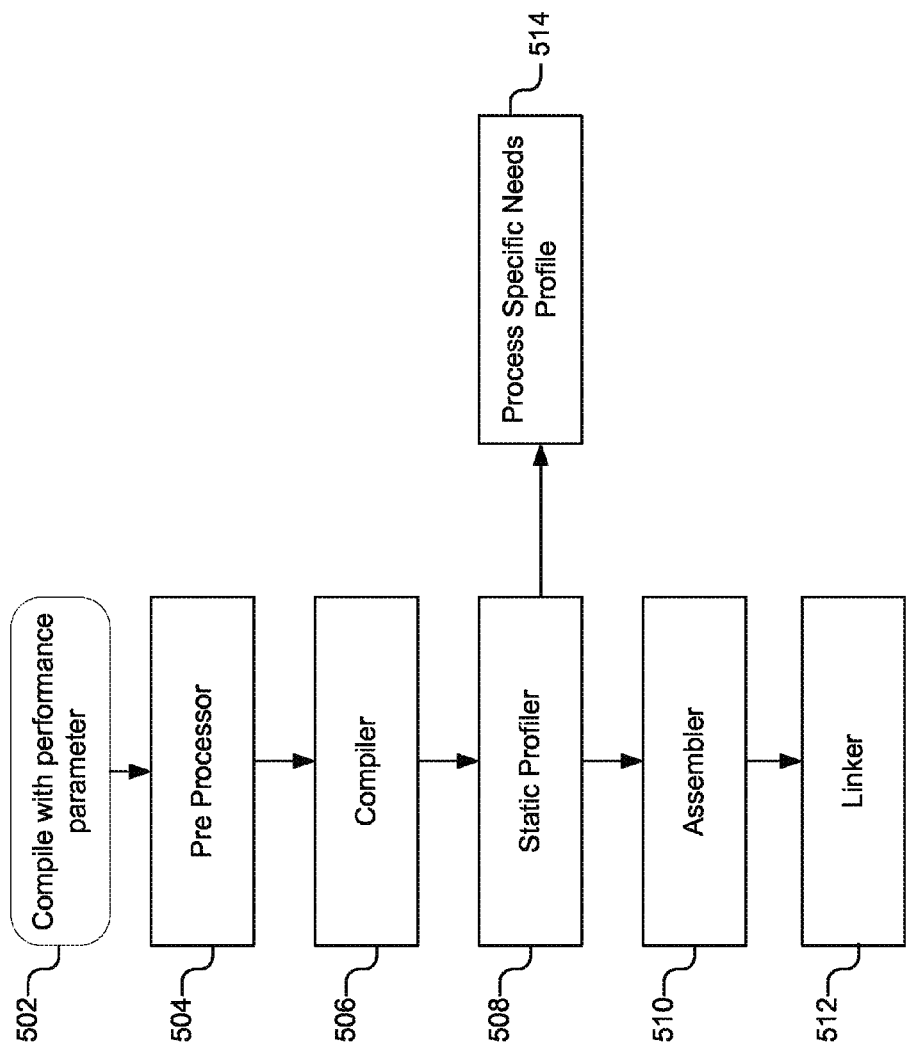
FIG. 5 shows the typical build process from converting source code to binary executables, according to an embodiment. A new static profiling stage is placed in between the compiler and assembler.

The diagram in FIG. 5 shows the needed steps with the addition of the static profile 508 to build an executable file from source code. The static profiler 508 is placed between the compiler 506 and the assembler 510 in this example for the sake of clarity, but may be placed in other locations in the process flow. The compiler 506 is used to convert the high level source code to assembly instructions as seen in examples 702, 704, and 706 which can be directly mapped to a functional unit in most architectures.

The static profiler algorithms shown in FIG. 6 takes a power versus performance input parameter 726 like shown in 708, 710, and 712 that may be passed as an input argument to the compiler from the command line or a static as a text file. In this example the parameter will either favor performance over power or visa versa. If input parameter is set for "performance" which is denoted by the binary value '1' in this example, the algorithm will take the right path as seen in step 604. With every check on this right path starting with step 622, if it is determined an integer ALU instruction is detected the algorithm will set the first two bits as "11" of the specific needs profile 514 like in examples 720 and 724 which denote that both integer ALUs 302 and 304 will be enabled. The algorithm will do similar checks for FP Add instructions 626, multiply instructions 630, and divide instructions 634. If the checks reveal that the FU is needed then it will enable both instances of the same FU. In the case where the power versus performance input parameter is set to '0' denoting that the programmer wants to favor power over performance then the profiling algorithm will take the left branch which is directly below the check in step 604. With every check on the left path starting with step 606 only one instance of an FU may be enabled, if it is determined that a floating point add instruction is detected in the program the algorithm will set only the third bit of the specific needs profile 514 like in the example of 722 which will denote that only FP Adder 306 will be enabled. The algorithm will do similar checks for FP Add instructions 610, multiply instructions 614, and divide instructions 618. If the checks reveal that the FU is needed then it will enable the first addressable instances of the same FU like the case of the FP adder in example 722. In any case at least one integer ALU 302 is enabled, as it is necessary for basic computation. Once the static profiler is done it will package the configuration bits by concatenating them together as seen in 638 to be placed into the OS look up table (LUT) 910 and configuration register 406 as needed when the process is running. The OS will store the specific needs profile 514 for each process that is currently running and during a context switch the OS will access the LUT 910 and then forward the specific needs profile 514 to the pipeline configuration register 406 where it will be latched during the entire duration of the time quantum.

The input parameter 726 may be implemented in hardware with the use of an AND gate mask to ensure that the performance versus power policy is enforced. In this scenario the 8 bit value of the specific need register 406 will be "AND-ed" with the binary mask value of "0b10101010" which will power gate one of each of the "like" functional units in 318 if not already power gated.

Figure 7:
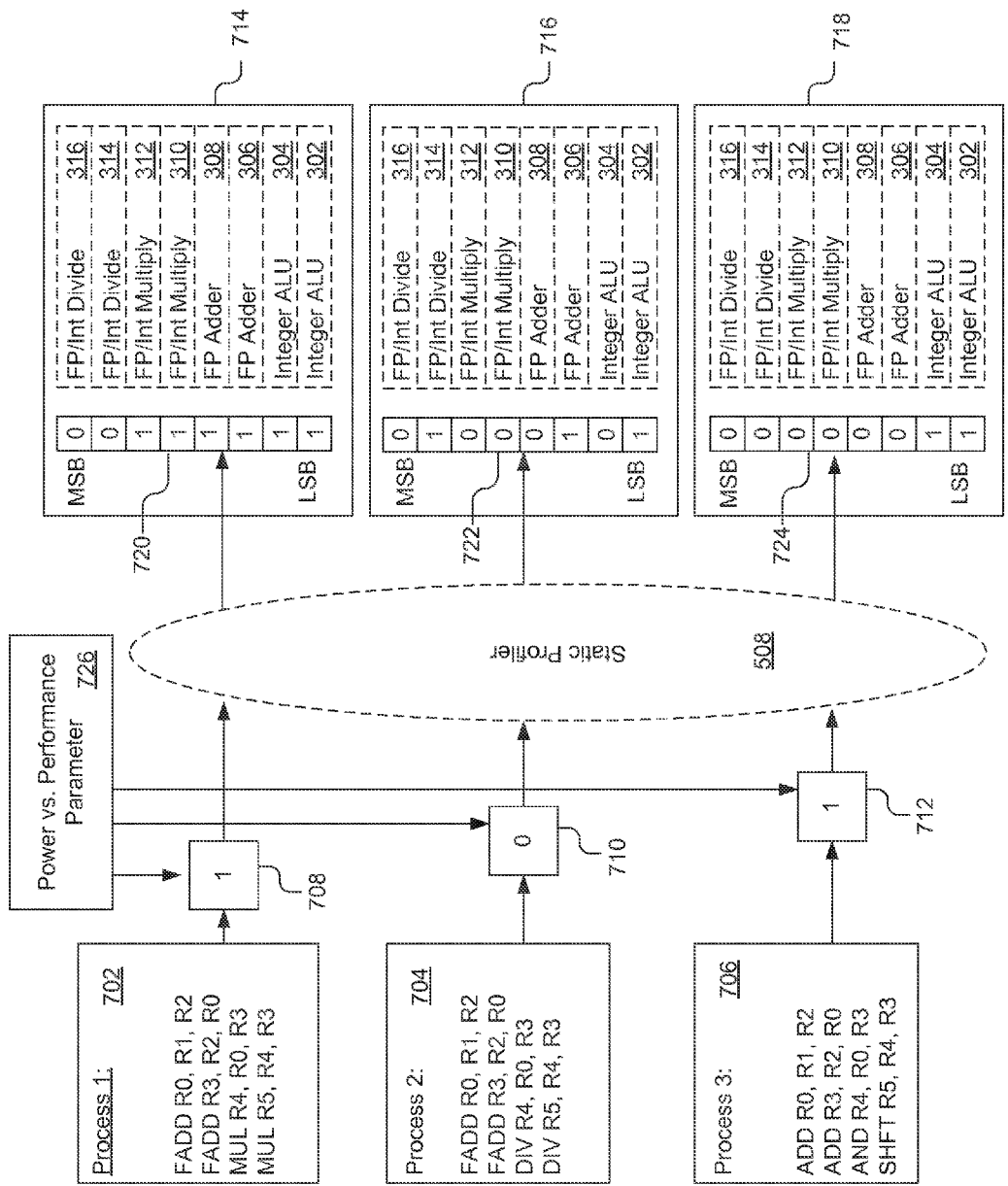
FIG. 7 shows three example code programs that could determine the mapping between the assembly instructions generated by the compiler and the FUs that will be enabled or power gated, according to an embodiment.
Figure 9:
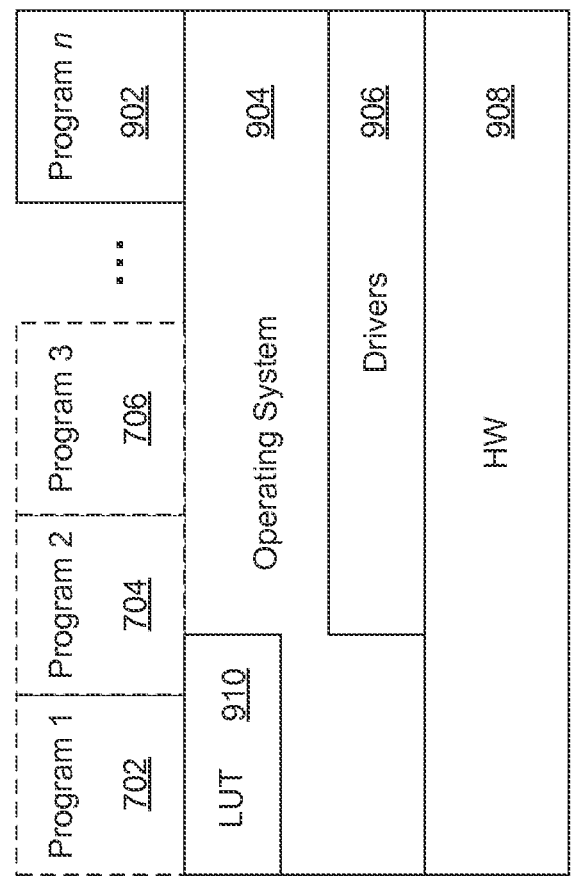
FIG. 9 shows the standard software stack for a computing system with the kernel drivers of the operating system and the application layer programs running in user space, according to an embodiment. The look up table (LUT) may be implemented in kernel space and is used to map the profiled configuration values determined by the static profiler to the process identification number (PID) of the program.
Figure 10:
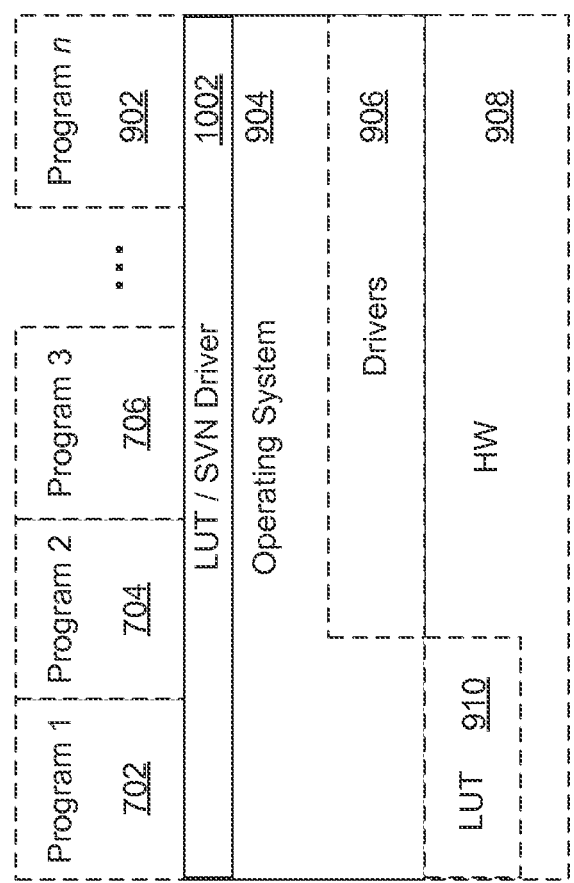
FIG. 10 shows an augmented view of FIG. 9 with a look up table implemented in the hardware layer and an operating system driver interface to allow software control of the specific need register 406 for the running process, according to an embodiment.
Figure 11:
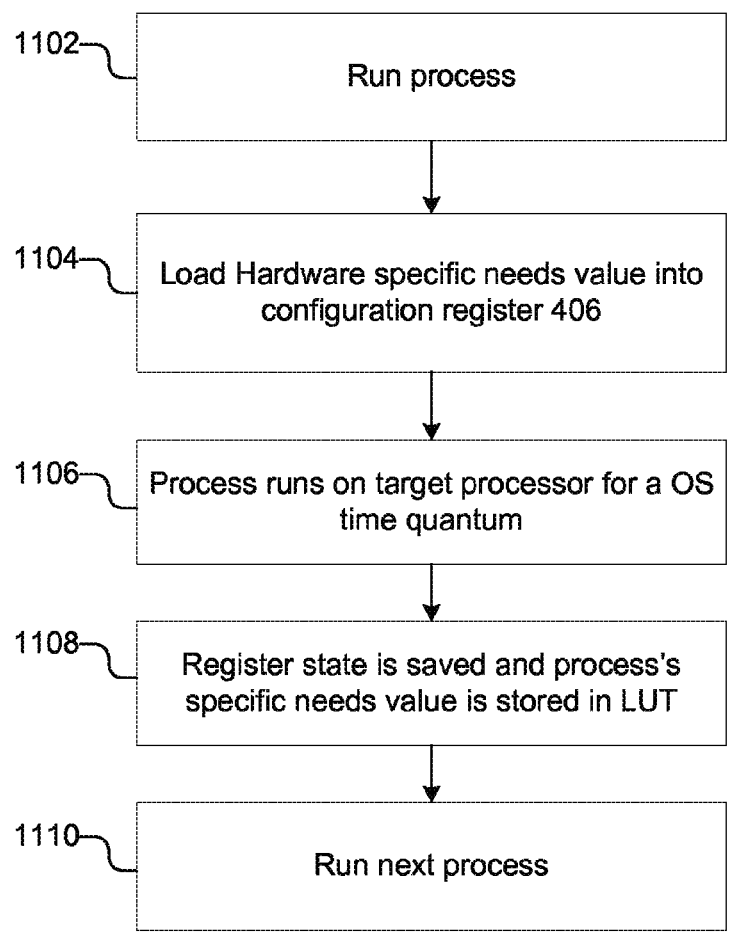
FIG. 11 shows the process flow required to load a process to be ran by the processor according to an embodiment.

From a temporal perspective the operations of this invention concept may best be illustrated by FIG. 7 and FIG. 8, which shows how the code snippets from the three example processes 702, 704, and 706 may be mapped to a specific needs profile 514 such as 720, 722, and 724. Elements 714, 716 and 718 show the mapping of which FUs will be enabled or power gated as dictated by the corresponding specific needs profiles 720, 722, and 724 respectively. FIG. 11 describes the loading of the SNV into configuration register 406 as shown in step 1104 prior to running the processes 702, 704, 706 shown in step 1106 according to an embodiment. The matrix described in FIG. 8 shows how the multitasking operation on a time multiplexed computing system may be augmented to support a pipeline profile such as 720, 722, 724 of each specific running process with its own dedicated hardware profile. In this example process 1 702 is running during the "time quantum 1" period where the execution units of 318 may be enabled or power gated depending on the specific need profile of process 702 which is 720. When the first time quantum 814 is over the OS 904 will perform a context switch 804 where in addition to other overhead, will forward the specific needs profile 722 of process 704 to the configuration register 406 where the profile will be latched for the entire duration of the next time quantum 816. The specific needs profile 722 for process 704 was created with a power vs. performance input parameter 710 that favors power over performance. Thus only half of the available needed FUs will be enabled during time quantum 816 as seen in the on/off state column 722 of FIG. 8. At the end of time quantum 816 the OS 904 will perform the next context switch 806 where the profile for process 706 will be forwarded to the configuration register 406 for the duration of the time quantum 818. At the end of this time quantum the OS performs a context switch 808 back to process 702 and the process repeats, per the management policies of the process scheduler in this example.

In addition the plurality of "like" functional units may include a lower performing non-pipelined FU for support a rare instruction case such as a floating point divide instruction that might be taken by an unlikely branch. In this case it may be desirable to have a lower performing FU with a lower leakage power signature than a larger high performance FU that may never be used.

Figure 12:
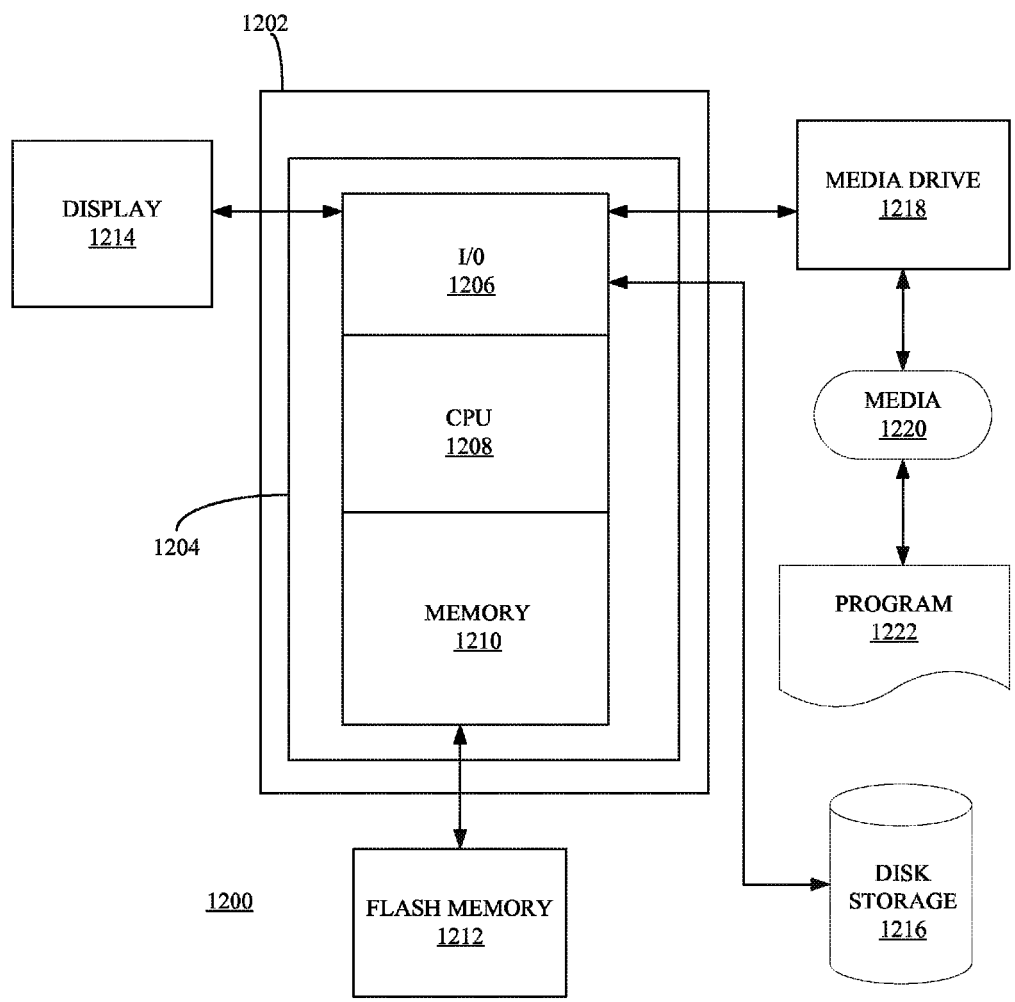
FIG. 12 is an exemplary computer system that may be operated as part of the system and/or method, according to an embodiment.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1206, one or more central processing units (CPU) 1208 (e.g., a developer processor, or a target processor), and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-readable medium 1220, which can contain programs 1222 and/or data. Computing system 1200 can include a web browser. Moreover, it is noted that computing system 1200 can be configured to include additional systems in order to fulfill various functionalities.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) or some specialized application-specific language (PHP, Java Script).

Figure 13:
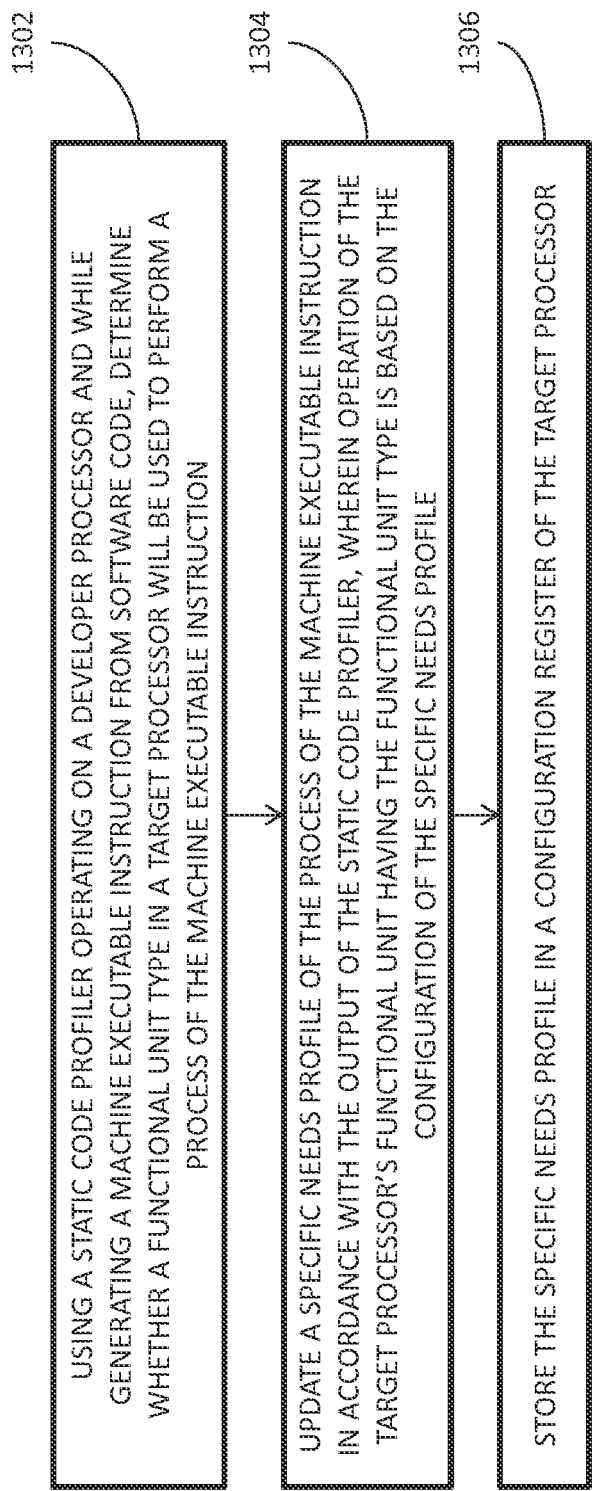
FIG. 13 is a process flow for controlling a functional unit, according to an embodiment.

FIG. 13 is a process flow for controlling a functional unit, according to an embodiment. In operation 1302, while generating a machine executable instruction from software code, a static code profiler operating on a developer processor is used to determine whether a functional unit type in a target processor will be used to perform a process of a machine executable instruction. In operation 1304, a specific needs profile of the process of the machine executable instruction is updated in accordance with the output of the static code profiler, wherein operation of the target processor's functional unit having the functional unit type is based on the configuration of the specific needs profile. In operation 1306, the specific needs profile is stored in a configuration register of the target processor.

In an embodiment, a method of controlling a functional unit of a target processor, includes, using a static code profiler 508 operating on a developer processor and while generating a machine executable instruction from software code, determining whether a functional unit type will be used to perform a process of the machine executable instruction. The method also includes updating a specific needs profile 514 of the process of the machine executable instruction in accordance with the output of the static code profiler, wherein operation of the functional unit having the functional unit type is based on the configuration of the specific needs profile. The method further includes storing the specific needs profile in a configuration register.

The specific needs profile may be configured to cause a power control unit 406 of the target processor to activate the functional unit after the static code profiler has determined that the process will use the functional unit. The specific needs profile may be configured to activate the functional unit for a predetermined period of time based on a duration of the operating system time quantum. The specific needs profile may be configured to cause a power control unit of the target processor to deactivate the functional unit when the process has been determined to avoid use of the functional unit. The functional unit may be one of an integer unit, a floating point adder, a floating point multiplier, a floating point divider, a load unit, a store unit, and a branch unit. A quantity of functional units having the functional unit type that are controlled by the specific needs profile may be based on a performance parameter 726.

The method may include controlling at least one of activation and deactivation of an additional functional unit in accordance with a performance parameter. The specific needs profile may be based on the performance parameter. The static code profiler may operate using the output of at least one of the preprocessor, the compiler, the assembler, and the linker. The static code profiler may operate based on the output of the compiler. The target processor may be the developer processor. The specific needs profile may be stored in the configuration register when a context switch may be invoked. The specific needs profile may be stored in the configuration register each time a context switch may be invoked.

The method may further include storing the specific needs profile for the process in a lookup table 910 that comprises a plurality of additional specific needs profiles for a corresponding set of additional processes. The method may also include, prior to storing the specific needs profile in the configuration register, retrieving the specific needs profile that corresponds to the process to be performed by the target processor from the lookup table. The specific needs profile may be accessed during each context switch.

The method may include, relative to a standard processor with the same functional units as the target processor and without functional unit deactivation capabilities, reducing energy consumption of the target processor by deactivating the functional unit. The method may also include, relative to a standard processor with the same functional units as the target processor and without functional unit deactivation capabilities, increasing the performance capability of the target processor by deactivating an unused functional unit and activating a useful functional unit.

In an embodiment, a computer-readable medium containing a sequence of instructions for controlling a functional unit, which when executed by a processor, causes the processor to, using a static code profiler operating on the processor and while generating a machine executable instruction from software code, determine whether a functional unit type will be used to perform a process of the machine executable instruction. The processor is further caused to update a specific needs profile of the process of the machine executable instruction in accordance with the output of the static code profiler, wherein operation of the functional unit having the functional unit type is based on the configuration of the specific needs profile. The processor is also caused to store the specific needs profile in a configuration register.

In an embodiment, a system for controlling a functional unit includes a static code profiler operating on a processor configured to determine whether a functional unit type will be used to perform a process of a machine executable instruction during a process to generate the machine executable instruction from software code. The system further includes a memory for receiving updates for a specific needs profile of the process of the machine executable instruction in accordance with the output of the static code profiler, wherein operation of the functional unit having the functional unit type is based on the configuration of the specific needs profile. The system also includes a configuration register configured to store the specific needs profile.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A method of controlling a functional unit of a target processor, the method comprising:
   using a static code profiler operating on a developer processor and while generating a machine executable instruction from software code, determining whether a functional unit type will be used to perform a process of the machine executable instruction;
   updating a specific needs profile of the process of the machine executable instruction in accordance with the output of the static code profiler, wherein operation of the functional unit having the functional unit type is based on the configuration of the specific needs profile;
   storing the specific needs profile in a configuration register and in a lookup table that comprises a plurality of additional specific needs profiles for a corresponding set of additional processes;
   retrieving the specific needs profile that corresponds to the process to be performed by the target processor from the lookup table; and,
   wherein the specific needs profile is accessed during each context switch of the operating system.

2. The method of claim 1, wherein the specific needs profile is configured to cause a power control unit of the target processor to activate the functional unit after the static code profiler has determined that the process will use the functional unit.

3. The method of claim 2, wherein the specific needs profile is configured to activate the functional unit for a predetermined period of time based on a duration of the operating system time quantum.

4. The method of claim 1, wherein the specific needs profile is configured to cause a power control unit of the target processor to deactivate the functional unit when the process has been determined to avoid use of the functional unit.

5. The method of claim 1, wherein the functional unit is one of an integer unit, a floating point adder, a floating point multiplier, a floating point divider, a load unit, a store unit, and a branch unit.

6. The method of claim 1, wherein a quantity of functional units having the functional unit type that are controlled by the specific needs profile is based on a performance parameter.

7. The method of claim 1, further comprising:
   controlling at least one of activation and deactivation of an additional functional unit in accordance with a performance parameter.

8. The method of claim 7, wherein the specific needs profile is based on the performance parameter.

9. The method of claim 1, wherein the static code profiler operates using the output of at least one of the preprocessor, the compiler, the assembler, and the linker.

10. The method of claim 1, wherein the static code profiler operates based on the output of the compiler.

11. The method of claim 1, wherein the target processor is the developer processor.

12. The method of claim 1, wherein the specific needs profile is stored in the configuration register when a context switch is invoked.

13. The method of claim 1, wherein the specific needs profile is stored in the configuration register each time a context switch is invoked.

14. The method of claim 1, further comprising: relative to a standard processor with the same functional units as the target processor and without functional unit deactivation capabilities, reducing energy consumption of the target processor by deactivating the functional unit.

15. The method of claim 1, further comprising:
   relative to a standard processor with the same functional units as the target processor and without functional unit deactivation capabilities, increasing the performance capability of the target processor by deactivating an unused functional unit and activating a useful functional unit.

16. A non-transitory computer-readable medium containing a sequence of instructions for controlling a functional unit, which when executed by a processor, causes the processor to:
   using a static code profiler operating on the processor and while generating a machine executable instruction from software code, determine whether a functional unit type will be used to perform a process of the machine executable instruction;
   update a specific needs profile of the process of the machine executable instruction in accordance with the output of the static code profiler, wherein operation of the functional unit having the functional unit type is based on the configuration of the specific needs profile; and
   store the specific needs profile in a configuration register and in a lookup table that comprises a plurality of additional specific needs profiles for a corresponding set of additional processes;
   retrieve the specific needs profile that corresponds to the process to be performed by the target processor from the lookup table; and,
   wherein the specific needs profile is accessed during each context switch of the operating system.

17. A system for controlling a functional unit, the system comprising:
   a static code profiler operating on a developer processor configured to determine whether a functional unit type will be used to perform a process of a machine executable instruction during a process to generate the machine executable instruction from software code,
   a memory for
      receiving updates for a specific needs profile of the process of the machine executable instruction in accordance with the output of the static code profiler, wherein operation of the functional unit having the functional unit type is based on the configuration of the specific needs profile;
      storing the specific needs profile for the process in a lookup table that comprises a plurality of additional specific needs profiles for a corresponding set of additional processes;

retrieving the specific needs profile that corresponds to the process to be performed by the target processor from the lookup table;
wherein the specific needs profile is accessed during each context switch of an operating system; and,
a configuration register configured to store the specific needs profile.

\* \* \* \* \*